(12) United States Patent
Kobayashi

(10) Patent No.: US 10,951,845 B2
(45) Date of Patent: Mar. 16, 2021

(54) PHOTOELECTRIC CONVERSION APPARATUS AND EQUIPMENT HAVING PHOTODIODE AND SEMICONDUCTOR REGIONS

(71) Applicant: CANON KABUSHIKI KAISHA, Tokyo (JP)

(72) Inventor: Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 16/560,742

(22) Filed: Sep. 4, 2019

(65) Prior Publication Data
US 2020/0084409 A1 Mar. 12, 2020

(30) Foreign Application Priority Data
Sep. 11, 2018 (JP) .............................. JP2018-169617

(51) Int. Cl.
*H04N 5/374* (2011.01)
*H04N 5/378* (2011.01)
(Continued)

(52) U.S. Cl.
CPC ......... *H04N 5/37457* (2013.01); *H04N 5/341* (2013.01); *H04N 5/3745* (2013.01)

(58) Field of Classification Search
CPC .. H04N 5/341; H04N 5/3745; H04N 5/37457; H04N 5/374; H04N 5/378; H04N 5/369; H01L 21/041; H01L 21/0455; H01L 21/823425; H01L 21/823418; H01L 27/14609; H01L 27/0694; H01L 27/098; H01L 27/14643
(Continued)

(56) References Cited

U.S. PATENT DOCUMENTS

| 5,619,262 A | 4/1997 | Uno |
| 7,317,214 B2 * | 1/2008 | Watanabe ............. H01L 29/732 357/183.1 |

(Continued)

FOREIGN PATENT DOCUMENTS

| JP | 2002-330351 A | 11/2002 |
| JP | 2016-19115 A | 2/2016 |
| WO | 2017/221715 A1 | 12/2017 |

*Primary Examiner* — Marly S Camargo
(74) *Attorney, Agent, or Firm* — Canon U.S.A., Inc. IP Division

(57) ABSTRACT

A photodiode that includes a first semiconductor region of a first conductive type and a second semiconductor region of a second conductive type opposite to the first conductive type, a third semiconductor region of the first conductive type holding a charge supplied from the first conductive region, a transistor that includes a gate connected to a node including the third semiconductor region, a fourth semiconductor region of the first conductive type as a drain, and a fifth semiconductor region of the first conductive type as a source, and a switch connecting the node and the drain are included, and one of the second and fifth semiconductor regions is a p-type semiconductor region supplied with first potential, the other of the second and fifth semiconductor regions is an n-type semiconductor region supplied with second potential, and the second potential is higher than the first potential.

17 Claims, 8 Drawing Sheets

(51) Int. Cl.
    *H04N 5/341*     (2011.01)
    *H04N 5/369*     (2011.01)
    *H01L 27/146*     (2006.01)
    *H01L 21/04*     (2006.01)
    *H01L 21/82*     (2006.01)
    *H01L 27/098*     (2006.01)
    *H04N 5/3745*     (2011.01)

(58) Field of Classification Search
    USPC ....... 348/308, 302, 294, 297, 287, 310, 331;
        257/291, 292, 24, 27, 110, 196, 204, 239,
        257/312; 250/208.1, 336.2, 338.4,
        250/370.08; 438/142, 163, 223, 227,
        438/621; 341/126, 155, 169, 170
    See application file for complete search history.

(56) References Cited

U.S. PATENT DOCUMENTS

| | | | |
|---|---|---|---|
| 8,159,577 B2* | 4/2012 | Iwata | H04N 5/2327 348/302 |
| 8,963,271 B2* | 2/2015 | Yamazaki | H01L 27/14623 257/435 |
| 10,819,931 B2* | 10/2020 | Goden | H04N 5/3745 348/301 |
| 2005/0116264 A1 | 6/2005 | Watanabe | |
| 2005/0161712 A1* | 7/2005 | Koyama | H01L 31/062 257/59 |
| 2010/0265373 A1 | 10/2010 | Tejada | |
| 2011/0248371 A1* | 10/2011 | Matsumura | H01L 27/146 257/443 |
| 2013/0070133 A1 | 3/2013 | Takazawa | |
| 2016/0044261 A1* | 2/2016 | Sakano | H04N 5/3742 348/308 |
| 2016/0126274 A1* | 5/2016 | Kobayashi | H01L 27/14661 257/291 |
| 2017/0134677 A1 | 5/2017 | Nishihara | |
| 2017/0212221 A1* | 7/2017 | Goden | G01S 7/481 250/208.2 |
| 2017/0280080 A1 | 9/2017 | Machida | |
| 2020/0029044 A1* | 1/2020 | Inui | H04N 5/378 348/135 |

* cited by examiner

PHOTOELECTRIC CONVERSION APPARATUS AND EQUIPMENT HAVING PHOTODIODE AND SEMICONDUCTOR REGIONS

BACKGROUND

Field

One disclosed aspect of the embodiments relates to a photoelectric conversion apparatus that includes a photodiode and a transistor.

Description of the Related Art

In a photoelectric conversion apparatus such as a Complementary Metal Oxide Semiconductor (CMOS) image sensor, pixel circuits are two-dimensionally arranged. Japanese Patent Laid-Open No. 2016-19115 discloses a pixel circuit that includes a photoelectric conversion portion and an amplification portion, in which the amplification portion includes a field effect transistor that has a source to which fixed potential is applied, a gate as an input terminal, and a drain connected to an output terminal.

In the pixel circuit described in Japanese Patent Laid-Open No. 2016-19115, a saturated light quantity of the photoelectric conversion portion is not sufficiently examined.

SUMMARY

According to a first aspect of the disclosure, a photoelectric conversion apparatus includes a photodiode, a third semiconductor region, a transistor, and a switch. The photodiode includes a first semiconductor region of a first conductive type and a second semiconductor region of a second conductive type opposite to the first conductive type. The third semiconductor region of the first conductive type holds a charge supplied from the first conductive region. The transistor includes a gate connected to a node including the third semiconductor region, a fourth semiconductor region of the first conductive type as a drain, and a fifth semiconductor region of the first conductive type as a source. The switch connects the node and the drain. One of the second semiconductor region and the fifth semiconductor region is a p-type semiconductor region to which first potential is supplied. The other of the second semiconductor region and the fifth semiconductor region is an n-type semiconductor region to which second potential is supplied. The second potential is higher than the first potential.

According to a second aspect of the disclosure, a photoelectric conversion apparatus includes a photodiode, a node, an N-type transistor, and a switch. The photodiode includes a cathode and an anode. The node holds a charge supplied from the cathode. The N-type transistor includes a gate connected to the node, a drain, and a source. The switch connects the node and the drain, in which first potential is supplied to the anode and second potential higher than the first potential is supplied to the source.

According to a third aspect of the disclosure, a photoelectric conversion apparatus includes a photodiode, a node, a P-type transistor, and a switch. The photodiode includes a cathode and an anode. The node holds a charge supplied from the anode. The P-type transistor includes a gate connected to the node, a drain, and a source. The switch connects the node and the drain, in which first potential is supplied to the source and second potential higher than the first potential is supplied to the cathode.

Further features of the present disclosure will become apparent from the following description of exemplary embodiments with reference to the attached drawings.

DESCRIPTION OF THE EMBODIMENTS

Hereinafter, a mode for carrying out the technology will be described with reference to drawings. Note that, in the following description and drawings, common reference signs will be assigned to common components through a plurality of drawings. Therefore, the common components will be described by mutually referring to the plurality of drawings, and description for the components to which the common reference signs are assigned will be appropriately omitted. Note that, components which have similar names and to which different reference signs are assigned may be distinguished by appropriately referring to the components as a first component, a second component, a third component, or the like.

Figure 1A:
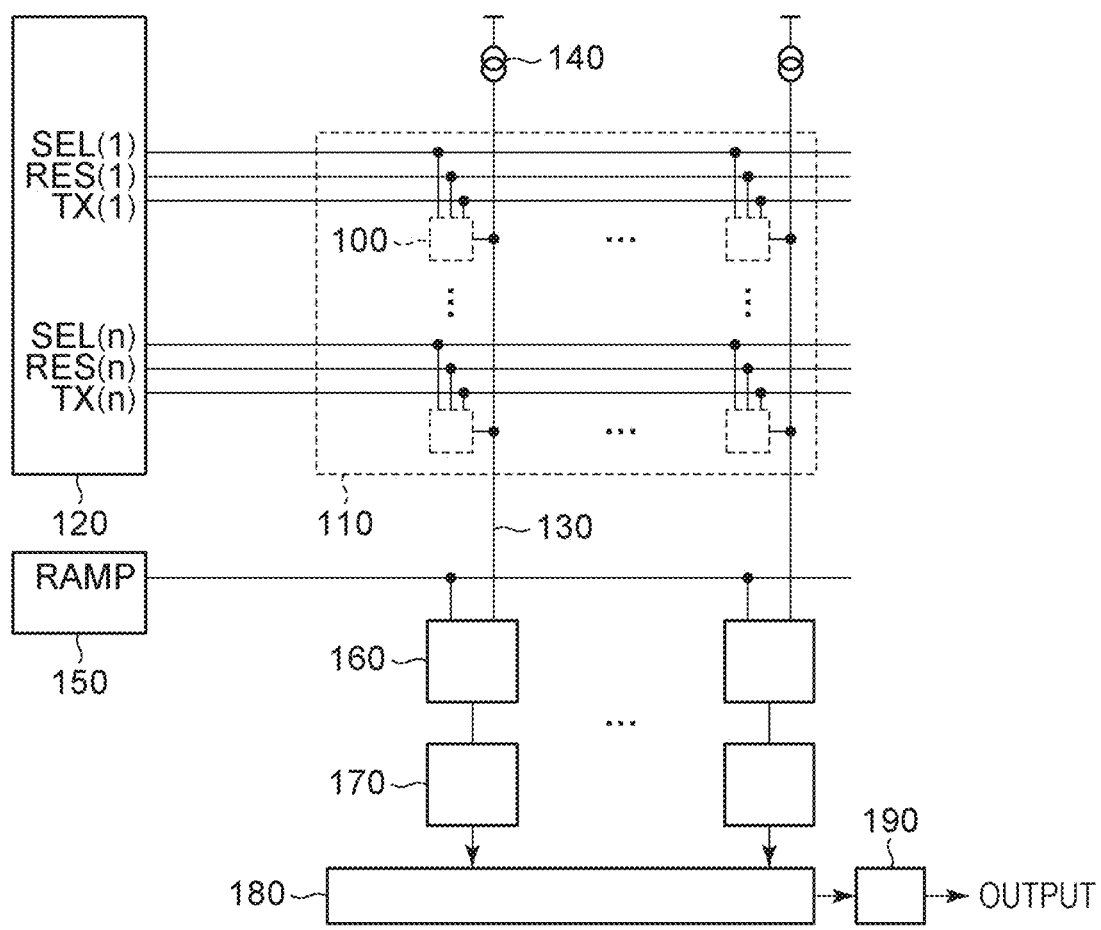
FIGS. 1A and 1B are schematic views for explaining a photoelectric conversion apparatus.

FIG. 1A is a schematic view of a typical photoelectric conversion apparatus. A pixel array 110 includes pixel circuits 100 that are two-dimensionally arranged. A vertical scanning circuit 120 drives each of the pixel circuits 100. A signal of the pixel circuit 100 is output to a signal line 130. A current source 140 to drive the pixel circuit 100 is connected to the signal line 130. A reference signal generator 150, a comparator 160, and a counter 170 are components of an AD (analog-to-digital) conversion circuit. Note that, here, a case where AD conversion is performed by using a ramp signal as a reference signal RAMP that is input to the comparator 160 is taken as an example, but successive approximation type AD conversion is also able to be performed. Digital signals from a plurality of AD conversion circuits are sequentially transferred to an output circuit 190 by a horizontal scanning circuit 180.

Figure 1B:
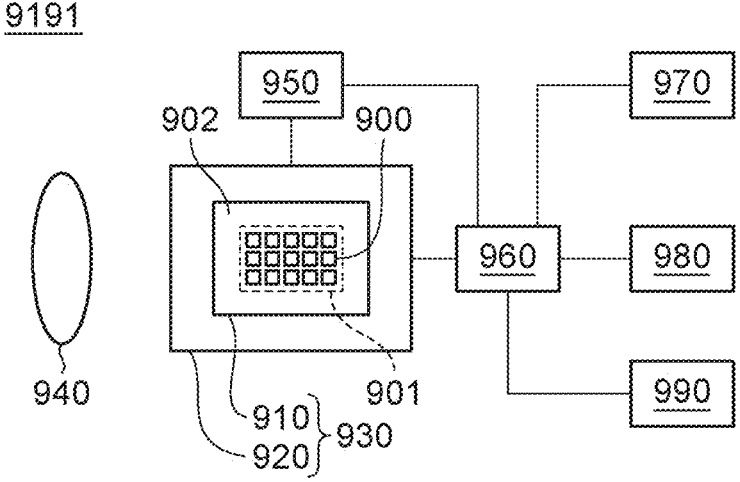

FIG. 1B is a schematic view of equipment 9191 that includes a photoelectric conversion apparatus 930. The equipment 9191 further includes at least any of an optical system 940, a control apparatus 950, a processing apparatus 960, a storage apparatus 970, a display apparatus 980, and a mechanical apparatus 990 in addition to the photoelectric conversion apparatus 930. The optical system 940 forms an image on the photoelectric conversion apparatus 930. The control apparatus 950 controls the photoelectric conversion apparatus 930. The processing apparatus 960 processes a signal output from the photoelectric conversion apparatus 930. The storage apparatus 970 stores information obtained by the photoelectric conversion apparatus 930. The display apparatus 980 displays the information obtained by the photoelectric conversion apparatus 930. The mechanical apparatus 990 operates on the basis of the information obtained by the photoelectric conversion apparatus 930. The mechanical apparatus 990 may be a moving apparatus by which the photoelectric conversion apparatus 930 is moved by the equipment 9191 or moved together with the equipment 9191.

The photoelectric conversion apparatus 930 can include an electronic device 910 and a mount member 920, but may not include the mount member 920. The electronic device 910 is a semiconductor device having a semiconductor layer. The electronic device 910 includes a pixel circuit area 901 in which pixel circuits 900 are arranged and a peripheral circuit area 902 in which peripheral circuits (not illustrated) are arranged. A configuration of the pixel circuit 100 in the present embodiment is able to be applied to a pixel circuit 900 in the equipment 9191. The peripheral circuits include the vertical scanning circuit 120, the AD conversion circuit, the horizontal scanning circuit 180, and the output circuit 190 which are described above. Additionally, the peripheral circuits also include a digital signal processing circuit, a control circuit, and the like. The pixel circuit area 901 and the peripheral circuit area 902 may be arranged on the same semiconductor layer, but may be arranged on different semiconductor layers that are mutually layered.

Figure 2A:
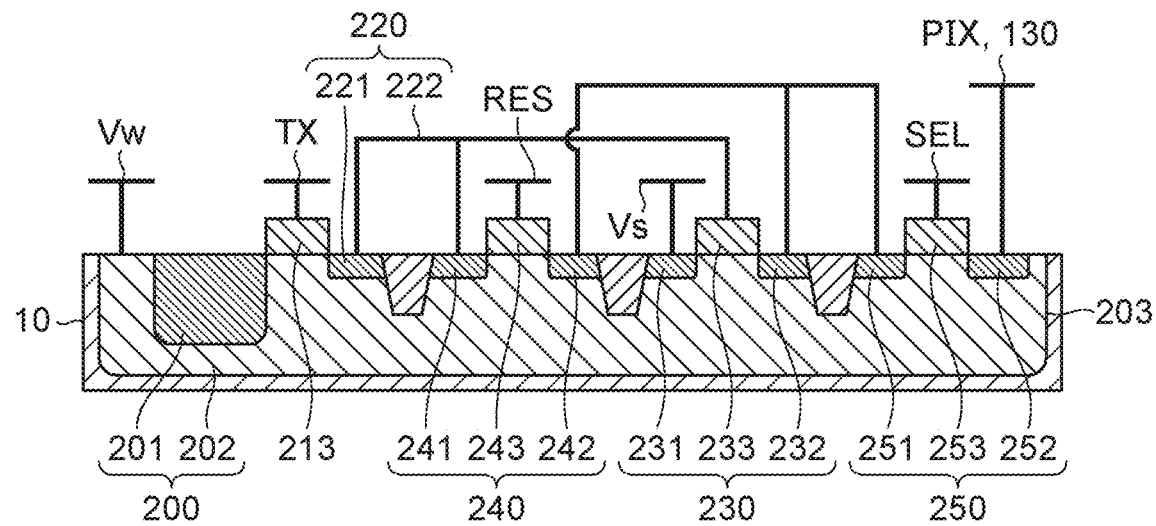
FIGS. 2A and 2B are schematic views for explaining the photoelectric conversion apparatus.

FIG. 2A is a sectional view illustrating an example of the photoelectric conversion apparatus 930 that includes the pixel circuit 100 in FIG. 1A. The pixel circuit 100 is constituted by semiconductor elements, such as a diode and a transistor, which are provided in a semiconductor layer 10. At least one of the semiconductor elements constituting the pixel circuit 100 is arranged in a well 203 of a second conductive type that is provided in an inside of the semiconductor layer 10. In the present example, the well 203 includes at least a semiconductor region 202, and the well 203 also includes a semiconductor region that constitutes a body (back gate) of the transistor of the pixel circuit 100. The pixel circuit 100 has a photodiode 200, a transfer transistor 210, a detection node 220, an amplification transistor 230, a reset transistor 240, and a selection transistor 250. The reset transistor 240 and the selection transistor 250 function as switches. The selection transistor 250 connects a drain of the amplification transistor 230 and the signal line 130. Each of the switches is able to be constituted by a transistor and the transistor is able to be constituted by a field effect transistor (FET), typically a Metal Oxide Semiconductor Field Effect Transistor (MOS-FET).

The photodiode 200 includes a semiconductor region 201 of a first conductive type and the semiconductor region 202 of the second conductive type opposite to the first conductive type. The transfer transistor 210 includes a gate 213 (transfer gate) and has a semiconductor region 221 of the first conductive type as a drain, and the semiconductor region 201 of the first conductive type as a source. The gate 213 is referred to as the transfer gate. The detection node 220 includes the semiconductor region 221 of the first conductive type that holds a charge supplied from the semiconductor region 201. The detection node 220 is a floating node, and the semiconductor region 221 is a floating diffusion. The amplification transistor 230 includes a gate 233 that is connected to the detection node 220, a semiconductor region 232 of the first conductive type as a drain, and a semiconductor region 231 of the first conductive type as a source.

The reset transistor 240 as a switch connects the detection node 220 and the drain (semiconductor region 232) of the amplification transistor 230.

A transfer signal TX, a reset signal RES, and a selection signal SEL are respectively supplied to the gate 213, a gate 243, and a gate 253. The signal line 130 is connected to a semiconductor region 252 and a pixel signal PIX is output from the amplification transistor 230 to the signal line 130 via the selection transistor 250. Note that, the selection transistor 250 is able to be omitted, and the semiconductor region 232 may be connected directly to the signal line 130. The signals TX, RES, and SEL can be supplied to the gate 213, 243, and 253 via lines from a signal supply unit included in the photoelectric conversion apparatus 930. The signals TX, RES, and SEL are signals to switch on/off of the gates.

The first conductive type is any one of an n-type and a p-type and the second conductive type is the other of the n-type and the p-type. Accordingly, one of the semiconductor region 202 and the semiconductor region 231 is an n-type semiconductor region. The other of the semiconductor region 202 and the semiconductor region 231 is a p-type semiconductor region.

A transistor a semiconductor region as a source and a semiconductor region as a drain of which are n-type semiconductor regions is an N-type transistor (NMOS). A transistor a semiconductor region as a source and a semiconductor region as a drain of which are p-type semiconductor regions is a P-type transistor (PMOS). In the N-type transistor, potential of the semiconductor region 232 as the drain is higher than potential (Vs) of the semiconductor region 231 as the source. In the P-type transistor, potential of the semiconductor region 232 as the drain is lower than potential (Vs) of the semiconductor region 231 as the source.

Potential Vw is supplied to the semiconductor region 202. The potential Vs is supplied to the semiconductor region 231 as the source of the amplification transistor 230. The potential Vw and the potential Vs can be supplied to the semiconductor regions 202 and 231 via lines from a potential supply unit included in the photoelectric conversion apparatus 930. Each of the potential Vw and the potential Vs is fixed potential in a circuit operation. The potential Vw and/or the potential Vs as the fixed potential may be variable depending on a mode. The potential Vw and the potential Vs are configured so that potential that is supplied to the n-type semiconductor region among the semiconductor regions 202 and 231 is higher than potential that is supplied to the p-type semiconductor region among the semiconductor regions 202 and 231.

A combination of the potential Vw and the potential Vs may be any of combinations of negative potential and negative potential, negative potential and ground potential, ground potential and positive potential, positive potential and positive potential, and negative potential and positive potential.

In a case where the first conductive type is the n-type, the p-type semiconductor region among the semiconductor regions 202 and 231 is the semiconductor region 202 and the n-type semiconductor region among the semiconductor regions 202 and 231 is the semiconductor region 231. Accordingly, it is configured such that the potential Vs that is supplied to the semiconductor region 231 is higher than the potential Vw that is supplied to the semiconductor region 202 (Vw<Vs).

In a case where the first conductive type is the p-type, the p-type semiconductor region among the semiconductor regions 202 and 231 is the semiconductor region 231 and the n-type semiconductor region among the semiconductor regions 202 and 231 is the semiconductor region 202. Accordingly, it is configured such that the potential Vw that is supplied to the semiconductor region 202 is higher than the potential Vs that is supplied to the semiconductor region 232.

Figure 2B:
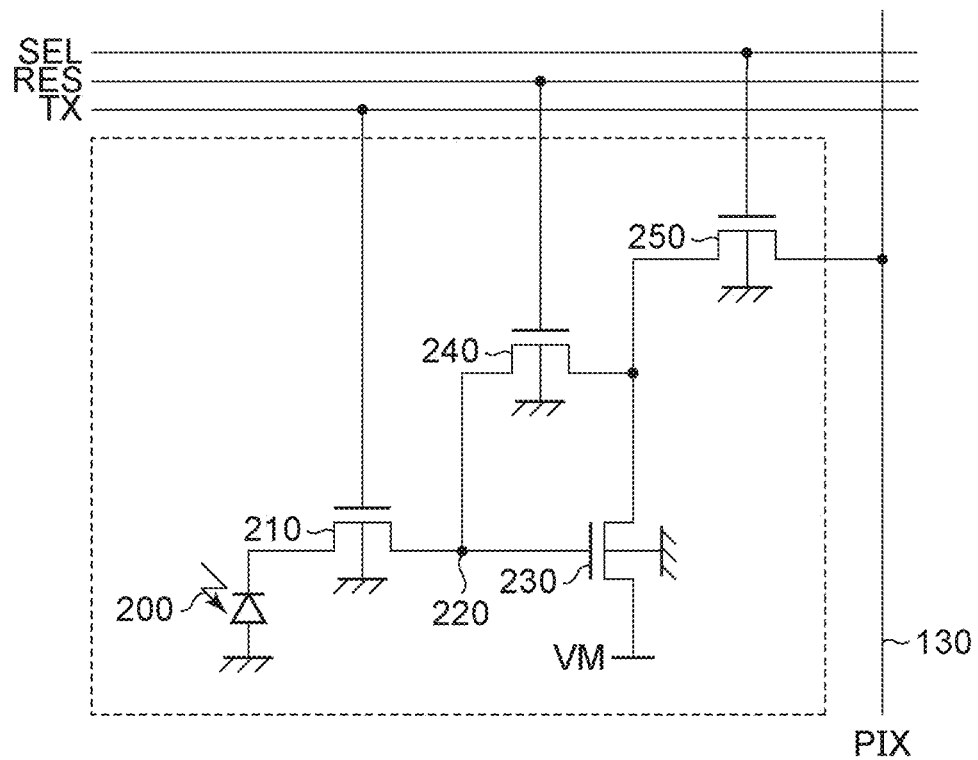

In FIG. 2B, the photodiode 200 and the transistors 210, 220, 230, 240, and 250 of the pixel circuit 100 in the case where the first conductive type is the n-type are indicated by general circuit symbols. In the case where the first conductive type is the n-type, the semiconductor region 201 is a cathode of the photodiode 200 and the semiconductor region 202 is an anode of the photodiode 200. It is configured such that ground potential GND is supplied as the potential Vw to the anode (semiconductor region 202) of the photodiode 200. It is configured such that positive potential VM (Vw=GND<VM=Vs) which is higher than the ground potential GND is supplied as the potential Vs to the source (semiconductor region 231) of the amplification transistor 230.

In the case where the first conductive type is the p-type, the semiconductor region 201 is an anode of the photodiode 200 and the semiconductor region 202 is a cathode of the photodiode 200. Then, it is configured such that the potential Vw is supplied to the cathode (semiconductor region 202) of the photodiode 200, and the potential Vs, which is higher than the potential Vw, is supplied to the source (semiconductor region 231) of the amplification transistor 230.

Figure 3A:
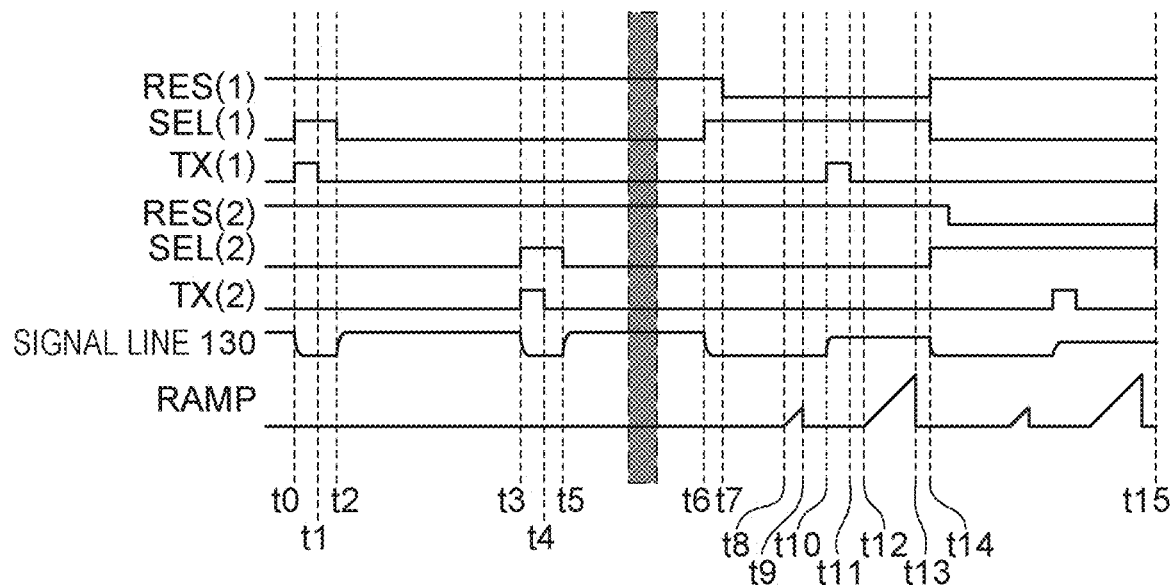
FIGS. 3A and 3B are timing charts for explaining the photoelectric conversion apparatus.

FIG. 3A is a timing chart illustrating an operation of the pixel circuit 100. When a selection signal SEL (1) reaches a high level at a time t0, the selection transistor 250 is turned on, and a pixel circuit 100 in a first row of the pixel array 110 in FIG. 1A is connected to the signal line 130. At this time, since a reset signal RES (1) is also at the high level, the drain of the amplification transistor 230 and the gate of the amplification transistor 230 to which the detection node 220 is connected are connected. Potential (gate potential Vg of the amplification transistor 230) of the detection node 220 at this time becomes potential (Vs+Vgs). The potential (Vs+Vgs) is potential obtained by adding a gate-source voltage Vgs of the amplification transistor 230 to source potential Vs (potential VM in the present example) of the amplification transistor 230. The voltage Vgs is determined in accordance with a current value Ics of the current source 140 and voltage-current characteristics of the amplification transistor 230. That is, potential of a terminal of the amplification transistor 230 changes on the basis of a configuration (such as a gate width, a gate length, or a gate capacitance) of the amplification transistor 230 as an MOS transistor so that a predetermined relationship between a source-drain voltage, the gate-source voltage, and a drain current is satisfied. In the present example, the drain current is defined by the current value Ics of the current source 140 (constant current source), the source potential is defined by the fixed potential Vs, and the drain and the gate of the amplification transistor 230 are short-circuited by the reset transistor 240. This make it possible to control drain potential and the gate potential of the amplification transistor 230 by the potential Vs.

Moreover, at the time t0, a transfer signal TX (1) also reaches the high level, so that the transfer transistor 210 is also brought into an on-state. Thereby, reset of the photodiode 200 is performed. At this time, in order to make the photodiode 200 have no photo charge, potential of the anode of the photodiode 200 is required to be lower than potential Vfd=(Vs+Vgs) of the detection node 220, as a depletion voltage of the photodiode 200. That is, Vfd>Vw is satisfied and the depletion voltage is Vfd−Vw=Vs+Vgs−Vw. At this time, when a capacitance of the photodiode 200 is Cpd, a saturation charge amount Qpd which is able to be held in the photodiode 200 is Cpd×(Vs+Vgs−Vw). In FIG. 2A, in a case where the source potential Vs of the amplification transistor 230 is the same as the anode potential Vw of the photodiode 200 (Vs=Vw), the saturation charge amount Qpd is reduced to Qpd=Cpd×Vgs. In the present exemplary embodiment, by setting the source potential Vs of the amplification transistor 230 to be higher than the anode potential Vw of the photodiode 200 (Vw=GND<VM=Vs), when GND=0V is satisfied, the saturation charge amount Qpd is Qpd=Cpd×(VM+Vgs). This makes it possible to increase the saturation charge amount of the photodiode 200 compared with a case of Vs=Vw.

At a time t1, the transfer signal TX (1) is at a low level and reset of the photodiode 200 is completed. Furthermore, at a time t2, the selection signal SEL (1) is at the low level and the connection between the pixel circuit 100 in the first row of the pixel array 110 of FIG. 1A and the signal line 130 is released. At this time, potential of the signal line 130 is raised from Vs+Vgs. This is because a capacitance accompanying the signal line 130 is charged by a current supplied from the current source 140. The potential of the signal line 130 is raised to almost a power supply voltage of the current source 140. In a case where there is no pixel circuit 100 that is connected to the signal line 130, in order not to raise the potential of the signal line 130 to almost the power supply voltage, a voltage source, a dummy pixel circuit, or the like, which is used to fix the potential of the signal line 130, may be connected to the signal line 130.

At times t3 to t5, by a similar operation to that at the times t0 to t2, reset of a photodiode 200 of a pixel circuit 100 in a next row of the pixel array 110 is performed. By such an operation, reset in all rows of pixel circuits 100 is performed. Then, after a desired exposure time has elapsed, an operation by which a photo charge accumulated in the photodiode 200 of the pixel circuit 100 is sequentially read row by row is started from a time t6. When the selection signal SEL (1) is at the high level at the time t6, the pixel circuit 100 in the first row of the pixel array 110 in FIG. 1A is connected to the signal line 130 again. At this time, the reset signal RES (1) is at the high level, the reset transistor 240 is in the on-state, so that the potential of each of the detection node 220 and the signal line 130 becomes Vs+Vgs (VM+Vgs in the present example). At a time t7, the reset signal RES (1) reaches the low level and the reset transistor 240 is brought into an off-state, so that reset of the detection node 220 is released. At this time, the potential of each of the detection node 220 and the signal line 130 becomes approximately Vs+Vgs, and a state where a reset signal of the pixel circuit 100 is output is provided. The counter 170 performs counting of a time during which the reference signal RAMP is made to have a rising slope from times t8 to t9 and potential of the reference signal RAMP exceeds the potential of the signal line 130 so that an output of the comparator 160 is inverted. A digital value that is a result of the counting becomes an analog-to-digital conversion result of the reset signal of the pixel circuit 100. At a time t10, when the transfer signal TX (1) is at the high level, the transfer transistor 210 is brought into the on-state, so that a charge (electron) that is generated by photoelectric conversion is transferred from the photodiode 200 to the detection node 220. The electron is converted into a voltage by a capacitance accompanying the detection node 220, and the potential of the detection node 220 is reduced. At this time, reduction is amplified by a source ground amplification circuit that is constituted by the amplification transistor 230 and the current source 140 and the resultant is output to the signal line 130. Since the source ground amplification circuit is an inverting amplifier, the potential of the signal line 130 rises. At a time t11, the transfer signal TX (1) is at the low level, and transfer of the electron ends. The counter 170 performs counting of a time during which the reference signal RAMP is made to have a rising slope again at times t12 to t13 and the potential of the reference signal RAMP exceeds the potential of the signal line 130 so that an output of the comparator 160 is inverted. A digital value that is a result of the counting becomes an analog-to-digital conversion result of a photo signal of the pixel circuit 100. A final digital signal value is obtained by taking a difference between the analog-to-digital conversion result of the photo signal and the aforementioned analog-to-digital conversion result of the reset signal. The difference can be taken in various manner, and an example thereof includes an operation that counting down is performed in the counter 170 when analog-to-digital conversion of a reset signal is performed and counting up is performed in the counter 170 when analog-to-digital conversion of a photo signal is performed. A final digital signal value of each counter 170 is sequentially transmitted to the output circuit 190 via the horizontal scanning circuit 180. At times t14 to t15, a reading operation similar to that at the times t6 to t14 is performed for a pixel circuit 100 in a row in which reading is performed. In this manner, the reading is performed sequentially row by row.

As described above, in the present exemplary embodiment, the source potential Vs of the amplification transistor 230 is set to be higher than the anode potential Vw of the photodiode 200, thus making it possible to increase the saturation charge amount of the photodiode 200.

In a case where a capacitance of the detection node 220 is Cfd, when the saturation charge amount Qpd is transferred to the detection node 220, the potential Vfd of the detection node 220 is Vfd=Qpd/Cfd. When Qpd=Cpd×(Vs+Vgs−Vw) is used, Vfd=(Cpd/Cfd)×(Vs+Vgs−Vw) is satisfied. When the saturation charge amount Qpd is transferred, the potential of the detection node 220 can be changed from potential (Vs+Vgs) at a time of the reset to potential (Cpd/Cfd)×(Vs+Vgs−Vw) at a time of transferring the saturation charge amount. In order to secure linearity of the amplification transistor 230, a difference ΔV between the potential Vfd of the detection node 220 at the time of the reset and the potential of the detection node 220 at the time of transferring the saturation charge amount may be set to satisfy ΔV≤Vgs−Vth. That is, Vs+Vgs−(Cpd/Cfd)×(Vs+Vgs−Vw)≤Vgs−Vth is obtained. When this is transformed, Cfd/Cpd ≤(Vs+Vgs−Vw)/(Vg+Vth) is satisfied. When this is further transformed, (Vs+Vth)*Cfd/Cpd−Vgs≤Vs−Vw is obtained.

In a first exemplary embodiment, the ground potential GND is supplied to a body of each of the transistors 210, 230, 240, and 250. The ground potential GND that is supplied to the body of each of the transistors 210, 230, 240, and 250 is the same as the ground potential GND that is supplied as the potential Vw. As illustrated in FIG. 2A, by arranging the photodiode 200 and the transistors 210, 230, 240, and 250 in the well 203 used in common, the potential supplied to the body of each of the transistors 210, 230, 240, and 250 is able to be the same as the potential Vw.

Figure 4A:
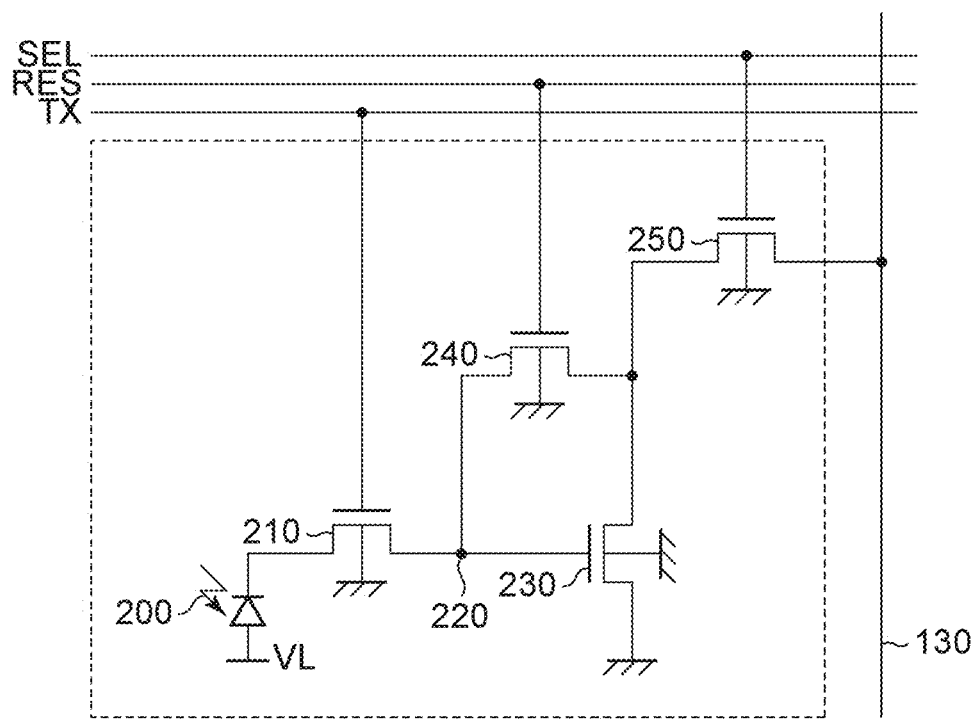
FIGS. 4A and 4B are schematic views for explaining the photoelectric conversion apparatus.

FIG. 4A illustrates a second exemplary embodiment obtained by modifying the first exemplary embodiment illustrated in FIG. 2B. In the second exemplary embodiment, description for a point that may be the same as that in the first embodiment will be omitted. It is configured such that, as the potential Vw, negative potential VL is supplied to the anode (semiconductor region 202) of the photodiode 200. It is configured such that, as the potential Vs, ground potential GNG that is higher than the negative potential VL is supplied to the source (semiconductor region 231) of the amplification transistor 230 (Vw=VL<GND=Vs). This makes it possible to increase the saturation charge amount of the photodiode 200, similarly to the first exemplary embodiment. In this case, similarly to the first exemplary embodiment, when the capacitance of the photodiode 200 is Cpd and the gate-source voltage of the amplification transistor 230 is Vgs, the saturation charge amount Qpd that is able to be held in the photodiode 200 is Qpd=Cpd×(Vs+Vgs−Vw). When Vs=GND=0V and Vw=VL<0 are satisfied, Qpd=Cpd×(Vgs−VL) is satisfied, and the saturation charge amount increases by the negative potential VL (Qpd=Cpd× Vgs+|VL|). Additionally, compared with the first exemplary embodiment, the source potential Vs of the amplification transistor 230 is lowered to the ground potential GND, thus making it possible to lower, from the potential VM+Vgs of the first exemplary embodiment to the potential Vgs, the potential of the signal line 130 after reset of the detection node 220 is performed. Thereby, it is possible to expand a dynamic range of a voltage in the signal line 130.

Figure 4B:
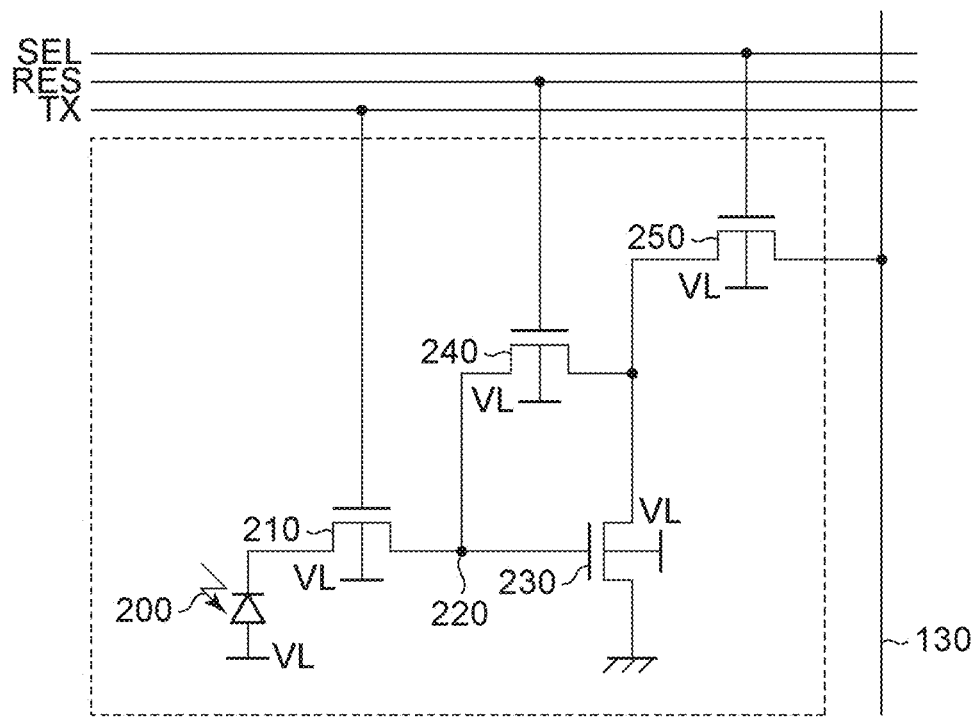

FIG. 4B illustrates a third exemplary embodiment obtained by modifying the second exemplary embodiment illustrated in FIG. 4A. In the third exemplary embodiment, description for a point that may be the same as that in the second exemplary embodiment will be omitted. Negative potential VL is supplied to the body of each of the transistors 210, 230, 240, and 250 in the second exemplary embodiment. The negative potential VL that is supplied to the body of each of the transistors 210, 230, 240, and 250 is desirably the same as the negative potential VL that is supplied as the potential Vw, but may be different therefrom. By arranging the photodiode 200 and the transistors 210, 230, 240, and 250 in the well 203 used in common, the potential supplied to the body of each of the transistors 210, 230, 240, and 250 is able to be the same as the potential Vw. By using the common well, it is not necessary to use a well separately for the photodiode 200, which is advantageous in microfabrication of a pixel circuit.

Note that, the amplification transistor 230 can constitute the source ground amplification circuit in all the first exemplary embodiment, the second exemplary embodiment, and the third exemplary embodiment. Even in a case where the potential Vs is not the ground potential GND as in the first exemplary embodiment, a circuit including the amplification transistor 230 is able to be regarded as a type of the source ground amplification circuit as long as the potential Vs of the source of the amplification transistor 230 is fixed potential.

Figure 5A:
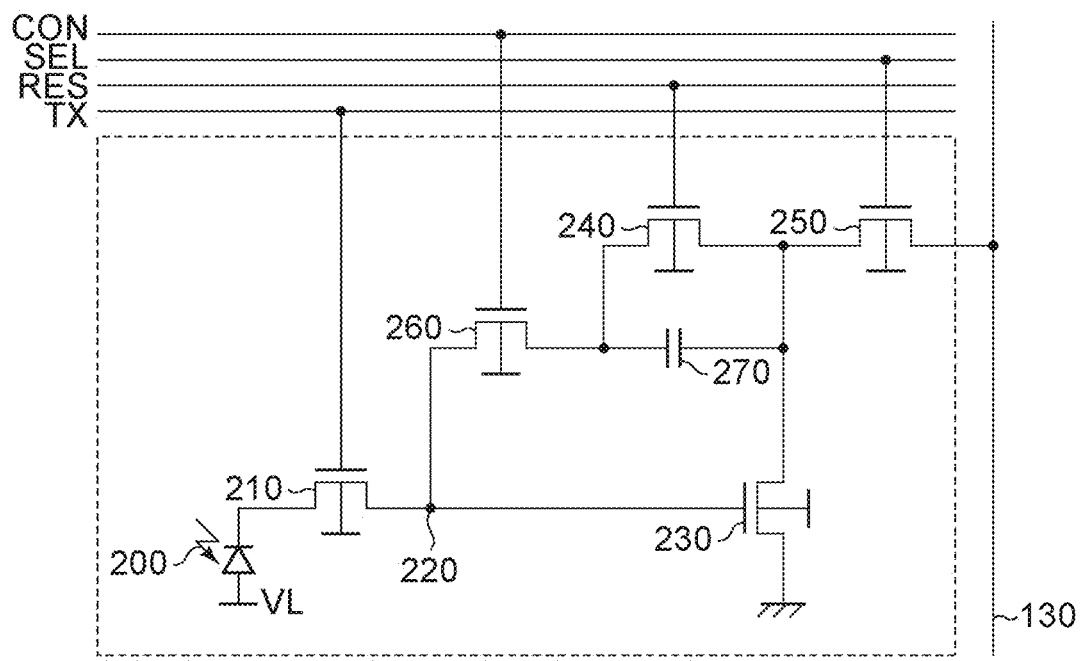
FIGS. 5A and 5B are schematic views for explaining the photoelectric conversion apparatus.

FIG. 5A illustrates a fourth exemplary embodiment obtained by modifying the second exemplary embodiment. In the fourth exemplary embodiment, description for a point that may be the same as that in the second exemplary embodiment will be omitted. In the fourth exemplary embodiment, a connection transistor 260 as a switch and a capacitor element 270 are added. The connection transistor 260 connects the reset transistor 240 and the detection node 220. The connection transistor 260 is connected in series to the reset transistor 240. The capacitor element 270 has two terminals, and one terminal of the capacitor element 270 is connected to the connection transistor 260 and the other terminal of the capacitor element 270 is connected to the drain of the amplification transistor 230. The capacitor element 270 is connected in parallel to the reset transistor 240. The capacitor element 270 is connected in series to the connection transistor 260.

By driving the connection transistor 260 always in the on-state, it is possible to increase the capacitance accompanying the detection node 220. Thereby, it is possible to suppress potential variations of the detection node 220 and the signal line 130 when photo charges that are the same quantities are transferred from the transfer transistor 210, and expand a range of a voltage that is able to be read with respect to a quantity of light. Note that, drive of other transistors is the same as that in the first exemplary embodiment. Moreover, when the drive is performed without increasing the capacitance accompanying the detection node 220, a control signal CON which drives a gate of the connection transistor 260 may be driven similarly to the reset signal RES. At this time, the capacitance accompanying the detection node 220 is the same as that of FIG. 5A. Thereby, it is possible to suppress deterioration in characteristics of a mode in which the drive is performed without increasing the capacitance of the detection node 220.

Figure 5B:
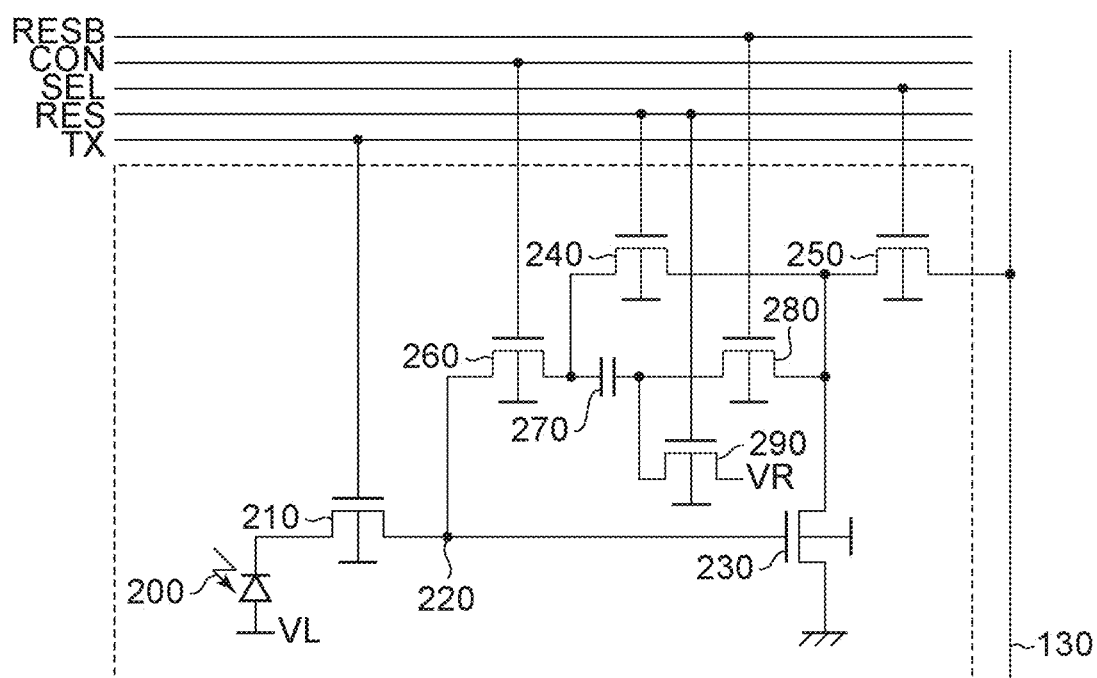

FIG. 5B illustrates a fifth exemplary embodiment obtained by modifying the fourth exemplary embodiment. In the fifth exemplary embodiment, description for a point that may be the same as that in the fourth embodiment will be omitted. In the fifth exemplary embodiment, a switch transistor 280 and a switch element 290 are added. The switch transistor 280 connects the other terminal of the capacitor element 270 and the drain of the amplification transistor 230. The switch transistor 290 is connected to the other terminal of the capacitor element 270 and a potential supply unit that supplies potential VR. In a case where reading is performed while the capacitor element 270 is connected to the detection node 220, by using the switch transistors 280 and 290, it is possible to further expand the dynamic range of the voltage in the signal line 130.

Figure 3B:
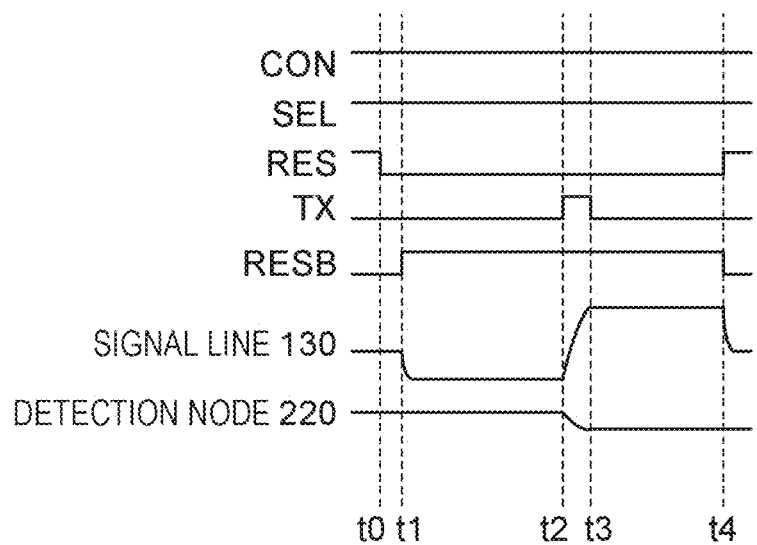

FIG. 3B is a timing chart illustrating an operation of a pixel circuit 100 in the fourth exemplary embodiment. At a time t0, the control signal CON and the selection signal SEL are at the high level, and the connection transistor 260 and the selection transistor 250 are in a conductive state. Moreover, a level of the reset signal RES is shifted from the high level to the low level. Accordingly, the reset transistor 240 and the switch transistor 290 are shifted into the off-state. At this time, the detection node 220 and the signal line 130 are at a reset level, and the terminal (the other terminal) of the capacitor element 270, which is connected to the switch transistor 290, has the potential VR. Note that, the potential VR is lower than potential when the detection node 220 and the signal line 130 are at the reset level. At a time t1, a reset signal RESB is at the high level, and the terminal (the other terminal) of the capacitor element 270, which is connected to the switch transistor 290, and the signal line 130 are connected. At this time, the potential of the signal line 130 is lowered from the potential at the reset level to almost the potential VR. When the terminal (the other terminal) of the capacitor element 270, which is connected to the switch transistor 290, and the signal line 130 are connected, the potential of the terminal (the other terminal) of the capacitor element 270, which is connected to the switch transistor 290, is raised for a moment. Thereby, the potential of the detection node 220 is raised, but, by the amplification transistor 230, the potential of the terminal (the other terminal) of the capacitor element 270, which is connected to the switch transistor 290, is returned to almost an original potential VR. Thus, the potential of the signal line 130 is also lowered to the potential VR. A raised amount of the potential of the detection node 220 is suppressed to a value obtained by dividing a difference between the potential at the reset level of the signal line 130 and the potential VR by a gain of the source ground amplification circuit constituted by the amplification transistor 230. When the transfer signal TX is at the high level at a time t2, a photo charge is transferred to the floating diffusion (semiconductor region 221) included in the detection node 220, the potential of the detection node 220 is lowered, and the potential of the signal line 130 is raised. At this time, a reference of the potential of the signal line 130 is the potential VR that is lower than the potential at the reset level, so that it is possible to expand the dynamic range of the voltage in the signal line 130.

Figure 6A:
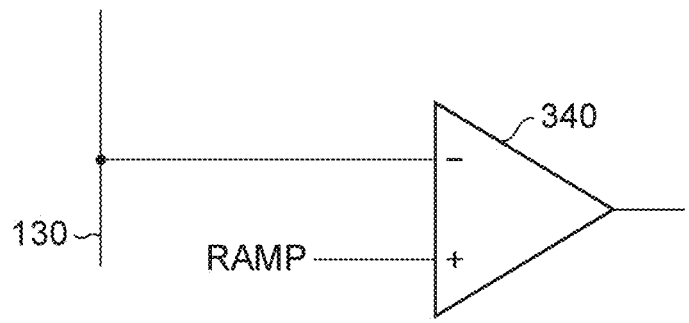
FIGS. 6A to 6C are schematic views for explaining the photoelectric conversion apparatus.

FIG. 6A illustrates a sixth exemplary embodiment to which the comparator 160 in FIG. 1A is applicable. In the sixth exemplary embodiment, the potential of the signal line 130 and the reference signal RAMP are compared by using an operation amplifier 340.

Figure 6B:
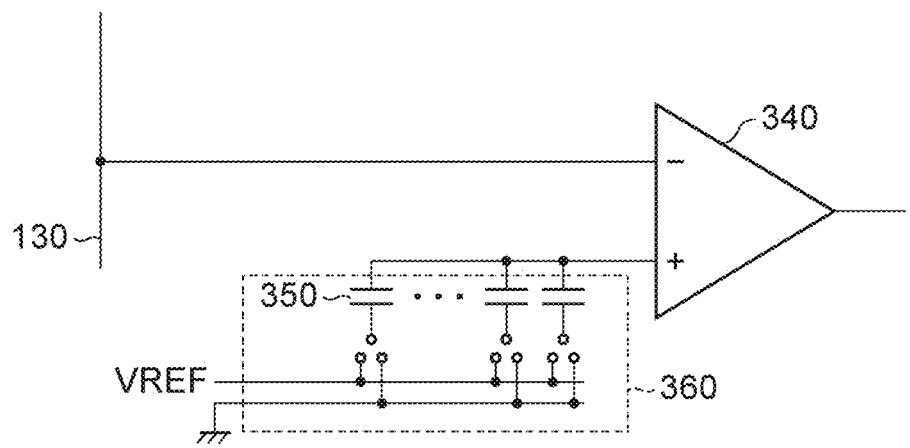

FIG. 6B illustrates a seventh exemplary embodiment to which the comparator 160 in FIG. 1A is applicable. In the seventh exemplary embodiment, successive approximation type AD conversion in which the potential of the signal line 130 and a signal supplied from a binary weight capacitor element group 360 are compared is also able to be performed.

Figure 6C:
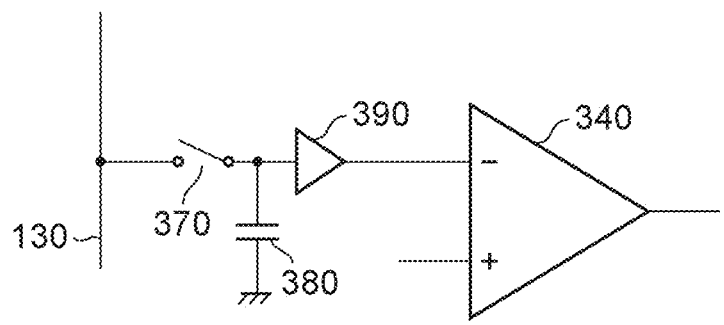

FIG. 6C illustrates an eighth exemplary embodiment to which the comparator 160 in FIG. 1A is applicable. In the eighth exemplary embodiment, a sampling and holding portion, which is constituted by a switch 370 and a capacitor element 380, and a buffer 390 are provided between the signal line 130 and the operation amplifier 340. Such a configuration makes it possible to start reading of a next signal in the signal line 130 while a signal of the signal line 130 is held in the capacitor element 380 and is subjected to a comparison with a predetermined signal by the operation amplifier 340, and is thus advantageous in increase of a speed.

Furthermore, in the present embodiment, the pixel circuit 100 adopts the source ground amplification circuit using the amplification transistor 230, so that it is possible to apply a gain larger than 1 in the pixel circuit 100. This makes it possible to reduce a gain in a following stage, suppress amplification of kTC noise generated by turning off the switch 370, and suppress a demerit of reduction in an SN ratio.

Figure 7A:
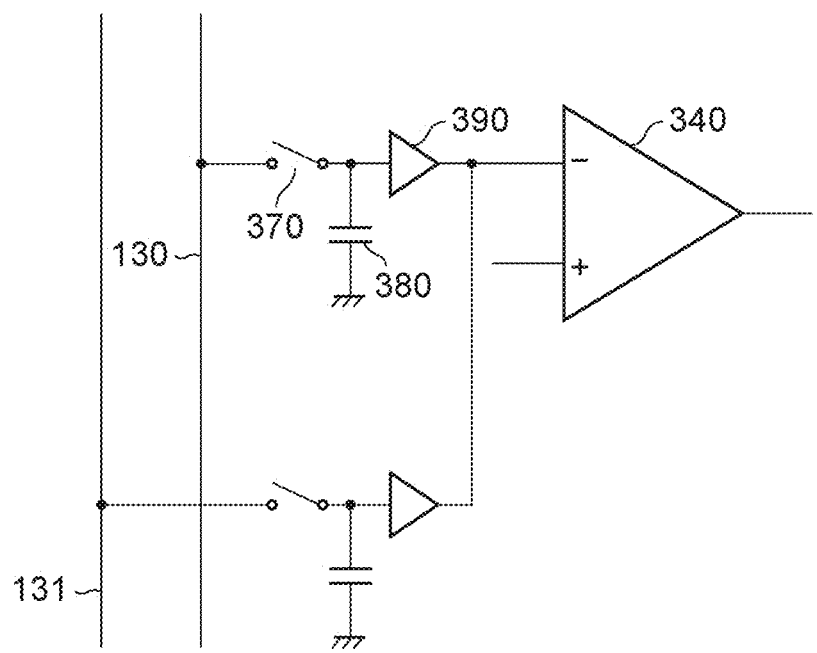
FIGS. 7A and 7B are schematic views for explaining the photoelectric conversion apparatus.

FIG. 7A illustrates a ninth exemplary embodiment to which the comparator 160 in FIG. 1A is applicable. In the ninth exemplary embodiment, by providing two switches 370, two capacitor elements 380, and two buffers 390, signals of two signal lines 130 and 131 are able to be held in the two capacitor elements 380 and sequentially input into the operation amplifier 340 for a comparison operation.

Figure 7B:
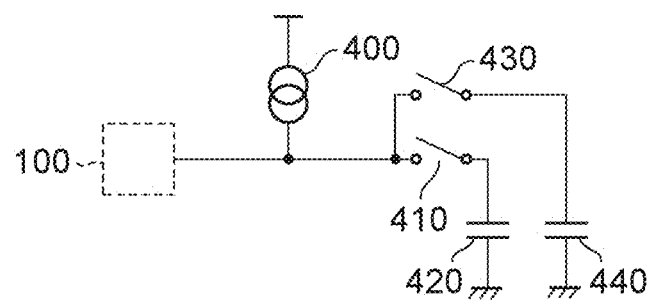

FIG. 7B illustrates a tenth exemplary embodiment to which the comparator 160 in FIG. 1A is applicable. In the tenth exemplary embodiment, a sampling and holding portion is provided in each of the pixel circuits 100. Each of the pixel circuits 100 includes the current source 400, a sampling and holding portion (a switch 410 and a capacitor element 420) for a reset level and a sampling and holding portion (a switch 430 and a capacitor element 440) for a signal. Thereby, reset of the photodiode 200, reading of the reset level of the detection node 220, and reading of a signal level are able to be simultaneously in all the pixel circuits 100, thus making it possible to reduce rolling distortion.

Figure 8A:
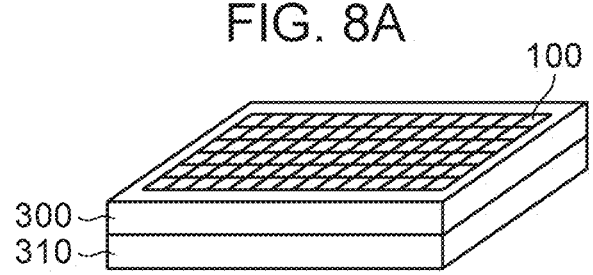
FIGS. 8A to 8C are schematic views for explaining the photoelectric conversion apparatus.
Figure 8B:
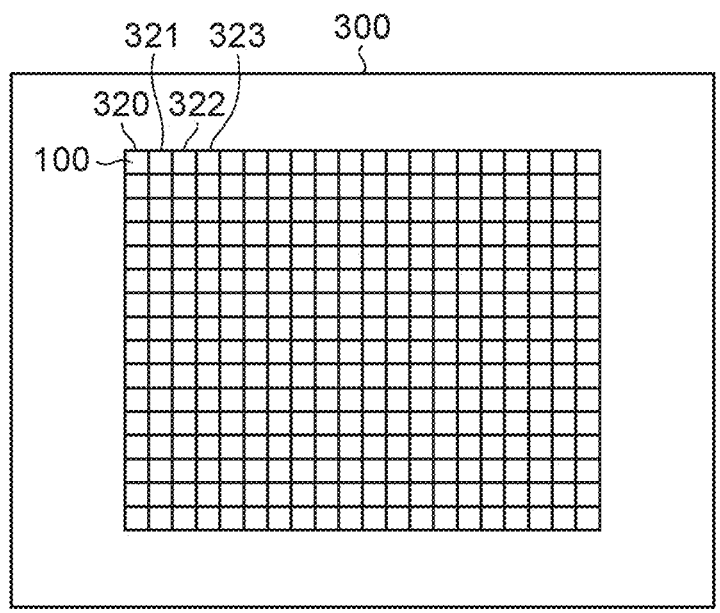
Figure 8C:
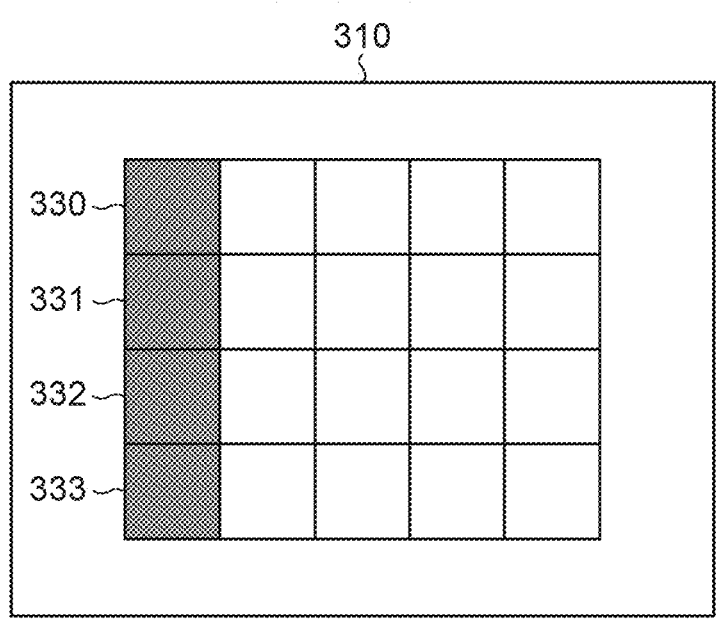

FIGS. 8A to 8C describe an eleventh exemplary embodiment that is applicable to the mode of FIG. 1A. Hereinafter, only a difference from the first exemplary embodiment will be described. A photoelectric conversion apparatus illustrated in FIG. 8A is configured by using two chips of a photoelectric conversion chip 300 and a signal processing chip 310. The photoelectric conversion chip 300 and the signal processing chip 310 are layered. The photodiode 200 and the amplification transistor 230 are provided on the same semiconductor layer of the photoelectric conversion chip 300. The signal processing chip 310 has a processing circuit that processes a digital signal based on an analog signal that is output from the amplification transistor 230. The signal processing chip 310 includes a different semiconductor layer which is layered on the semiconductor layer of the photoelectric conversion chip 300, and the processing circuit is provided on the different semiconductor layer. Electrical connection of the photoelectric conversion chip 300 and the signal processing chip 310 is able to be achieved by various methods. As the electrical connection, for example, connection by a through electrode (TSV) that penetrates a semiconductor layer, connection through direct bonding of lines of the chips, connection by a bump between the chips, connection by a wire (bonding wire) that is bonded to each of the chips, or the like is able to be adopted. In this manner, when a circuit other than the pixel circuit 100 is arranged in the signal processing chip 310 provided separately from the photoelectric conversion chip 300, it is possible to increase an area of the pixel circuits 100 that is occupied in the photoelectric conversion chip 300. Thus, it becomes possible to increase an area of the photodiode 200, increase the number of pixels, or reduce a size of the photoelectric conversion apparatus.

The photoelectric conversion chip 300 has pixel circuit groups 320 to 323 as illustrated in FIG. 8B and the signal processing chip 310 has signal processing circuits 330 to 333 as illustrated in FIG. 8C. Each of the pixel circuit groups 320 to 323 corresponds to a column of pixel circuits, for example. The signal processing circuits 330 to 333 respectively processes pixel signals that are supplied from the pixel circuit groups 320 to 323, in parallel among columns. Other pixel circuit groups and other signal processing circuits perform similar processing operations, resulting that reading is sequentially performed row by row. Each of the signal processing circuits 330 to 333 includes the current source 140, the comparator 160, and the counter 170 that are illustrated in FIG. 1A, for example. The vertical scanning circuit 120 and the reference signal generator 150 are also able to be provided on a side of the signal processing chip 310. Since the pixel circuit 100 is able to be configured by using only an N-type transistor, the photoelectric conversion chip 300 is able to be configured by only the N-type transistor without using a P-type transistor. This makes it possible to reduce process cost. Note that, a part of transistors of the pixel circuits 100 is able to be arranged in the signal processing chip 310 or a part of the signal processing circuit is able to be incorporated in the pixel circuit 100. For example, the amplification transistor 230 described above may be used as an input transistor forming a differential pair with the comparator 160.

Note that, in the aforementioned exemplary embodiments, description has been given by using an electron accumulation photodiode and an N-type transistor, but there is no limitation. A hole accumulation photodiode or a P-type transistor may be used. Moreover, the configuration in which one signal line 130 is provided in one pixel column has been described above as an example, but a configuration in which multiple lines are provided so that pixels in a plurality of rows are simultaneously read may be provided. Furthermore, the configuration in which one photodiode 200 transfers a charge to one detection node 220 has been described above as an example, but a configuration in which a plurality of photodiodes share one detection node 220 and a charge is selectively transferred may be provided. Additionally, adding signals between the pixel circuits 100 may be performed.

The equipment 9191 illustrated in FIG. 1B will be described in detail. The mount member 920 includes a ceramic package or a plastic package, a printed wiring board, a flexible cable, solder, wire boding, and the like. The optical system 940 is a lens, a shutter, a filter, or a mirror, for example. The control apparatus 950 is, for example, a semiconductor device such as an ASIC (Application Specific Integrated Circuit). The processing apparatus 960 is a semiconductor device such as a CPU (Central Processing Unit) or an ASIC, which constitutes an AFE (analog front-end) or a DFE (digital front-end), for example. The display apparatus 980 is, for example, an EL display apparatus or a liquid crystal display apparatus. The storage apparatus 970 is a volatile memory such as an SRAM or a DRAM or a nonvolatile memory such as a flash memory or a hard disk drive, and is, for example, a magnetic device or a semiconductor device. The mechanical apparatus 990 includes a movable unit or a propelling unit such as a motor or an engine.

The equipment 9191 illustrated in FIG. 1A can be electronic equipment such as an information terminal (for example, a smartphone or a wearable terminal) which has a photographing function or a camera (for example, a lens interchangeable type camera, a compact camera, a video camera, or a monitoring camera). The mechanical apparatus 990 in the camera is able to drive a part of the optical system 940 for zooming, focusing, or a shutter operation. Moreover, the equipment 9191 can be transport equipment (mobile body) such as a vehicle, a vessel, an aircraft, or an artificial satellite. The mechanical apparatus 990 in the transport equipment can be used as a moving apparatus. The equipment 9191 as the transport equipment is suitable for one that transports the photoelectric conversion apparatus 930 or one that assists and/or automates an operation (manipulation) by a photographing function. The processing apparatus 960 for assisting and/or automating the operation (manipulation) is able to perform processing for operating the mechanical apparatus 990 as the moving apparatus on the basis of information obtained by the photoelectric conversion apparatus 930. Moreover, the equipment 9191 can be analysis equipment or medical equipment.

The photoelectric conversion apparatus 930 according to the present embodiment is able to provide a designer, a manufacturer, a seller, a purchaser, and/or a user thereof with a high value. Accordingly, it is also possible to enhance a value of the equipment 9191 when the photoelectric conversion apparatus 930 is mounted on the equipment 9191. Thus, for manufacturing or selling the equipment 9191, deciding to mount the photoelectric conversion apparatus 930 of the present embodiment on the equipment 9191 is advantageous to enhance a value of the photoelectric conversion apparatus 930.

Not only description as the text but also all respects that are able to be read from the text and all respects that are able to be read from the attached drawings are included in the embodiment included in the disclosure. In the present embodiment, addition, deletion, or replacement of a component is allowed in a range not departing from the concept of the disclosure.

According to an embodiment, it is possible to provide a technique that is advantageous for improvement in a saturated light quantity of a photodiode.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-169617, filed Sep. 11, 2018, which is hereby incorporated by reference herein in its entirety.

What is claimed is:

1. A photoelectric conversion apparatus comprising:
a photodiode that includes a first semiconductor region of a first conductive type and a second semiconductor region of a second conductive type opposite to the first conductive type;
a third semiconductor region of the first conductive type that holds a charge supplied from the first conductive region;
a transistor that includes a gate connected to a node including the third semiconductor region, a fourth semiconductor region of the first conductive type as a drain, and a fifth semiconductor region of the first conductive type as a source; and
a switch that connects the node and the drain, wherein one of the second semiconductor region and the fifth semiconductor region is a p-type semiconductor region to which first potential is supplied,
the other of the second semiconductor region and the fifth semiconductor region is an n-type semiconductor region to which second potential is supplied, and
the second potential is higher than the first potential.

2. The photoelectric conversion apparatus according to claim 1, wherein the first conductive type is an n-type.

3. The photoelectric conversion apparatus according to claim 1, wherein the first conductive type is a p-type.

4. The photoelectric conversion apparatus according to claim 1, wherein the first potential is negative potential.

5. The photoelectric conversion apparatus according to claim 1, wherein the first potential is ground potential.

6. The photoelectric conversion apparatus according to claim 1, wherein the second potential is positive potential.

7. The photoelectric conversion apparatus according to claim 1, wherein the second potential is ground potential.

8. The photoelectric conversion apparatus according to claim 1, wherein the transistor constitutes a source ground amplification circuit.

9. The photoelectric conversion apparatus according to claim 1 further comprising a switch that connects the drain and a signal line.

10. The photoelectric conversion apparatus according to claim 1 further comprising: a second switch that connects, with the switch as a first switch, the first switch and the node; and a capacitor element that includes a first terminal and a second terminal, wherein the first terminal is connected to the second switch and the second terminal is connected to the drain.

11. The photoelectric conversion apparatus according to claim 10 further comprising: a third switch that connects the second terminal and the drain; and a fourth switch that is connected to the second terminal and a potential supply unit.

12. The photoelectric conversion apparatus according to claim 1 further comprising a capacitance that samples and holds a signal output from the transistor.

13. The photoelectric conversion apparatus according to claim 1 further comprising an AD conversion circuit that performs AD conversion for a signal output from the transistor, wherein the signal output from the transistor is input to a comparator of the AD conversion circuit without being amplified.

14. The photoelectric conversion apparatus according to claim 1, wherein the photodiode and the transistor are provided on the same semiconductor layer.

15. The photoelectric conversion apparatus according to claim 14 further comprising a processing circuit that processes a digital signal based on an analog signal output from the transistor, wherein the processing circuit is provided on a different semiconductor layer which is layered on the semiconductor layer.

16. Equipment comprising the photoelectric conversion apparatus according to claim 1, and further comprising at least any one of:
an optical system that forms an image in the photoelectric conversion apparatus;
a control apparatus that controls the photoelectric conversion apparatus;
a processing apparatus that processes a signal output from the photoelectric conversion apparatus;
a mechanical apparatus that is controlled on a basis of information obtained by the photoelectric conversion apparatus;
a display apparatus that displays the information obtained by the photoelectric conversion apparatus; and
a storage apparatus that stores the information obtained by the photoelectric conversion apparatus.

17. The equipment according to claim 16, wherein the mechanical apparatus is a moving apparatus by which the photoelectric conversion apparatus is moved.

* * * * *